United States Patent
Vanderveen

(10) Patent No.: US 9,264,881 B2
(45) Date of Patent: Feb. 16, 2016

(54) METHODS AND APPARATUS FOR ENHANCED SYSTEM ACCESS CONTROL FOR PEER-TO-PEER WIRELESS COMMUNICATION NETWORKS

(75) Inventor: Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 12/984,082

(22) Filed: Jan. 4, 2011

(65) Prior Publication Data

US 2012/0173623 A1 Jul. 5, 2012

(51) Int. Cl.
*G06F 15/16* (2006.01)
*H04W 8/00* (2009.01)
*H04W 12/02* (2009.01)
*H04L 29/08* (2006.01)
*H04L 29/06* (2006.01)

(52) U.S. Cl.
CPC .............. *H04W 8/005* (2013.01); *H04W 12/02* (2013.01); *H04L 63/0428* (2013.01); *H04L 63/08* (2013.01); *H04L 67/104* (2013.01); *H04L 67/16* (2013.01)

(58) Field of Classification Search
CPC ..... H04L 63/08; H04L 63/0428; H04L 67/16; H04L 67/104; H04W 8/005; H04W 12/02
USPC ................. 709/203, 204, 224, 227; 726/26; 370/312
See application file for complete search history.

(56) References Cited

U.S. PATENT DOCUMENTS

| | | | | |
|---|---|---|---|---|
| 4,864,616 A * | 9/1989 | Pond et al. | ..................... | 713/165 |
| 5,060,266 A * | 10/1991 | Dent | .............................. | 380/274 |
| 5,289,579 A * | 2/1994 | Punj | ............................... | 709/227 |
| 7,197,296 B2 * | 3/2007 | Little et al. | ..................... | 455/410 |
| 7,206,841 B2 * | 4/2007 | Traversat et al. | ............. | 709/225 |
| 8,635,327 B1 * | 1/2014 | Levergood et al. | ........... | 709/224 |
| 2002/0143944 A1 * | 10/2002 | Traversat et al. | ............. | 709/225 |
| 2003/0177378 A1 * | 9/2003 | Wittkotter | ..................... | 713/193 |
| 2004/0010553 A1 * | 1/2004 | Katz et al. | ..................... | 709/206 |

(Continued)

FOREIGN PATENT DOCUMENTS

| | | |
|---|---|---|
| EP | 2015485 | 10/2011 |
| WO | WO2007082250 A2 | 7/2007 |

(Continued)

OTHER PUBLICATIONS

Slim Trabelsi, et al., "Enabling Secure Service Discovery with Attribute Based Encryption", Institut Eurecom Department of Corporate Communications, 2006, pp. 19.

(Continued)

*Primary Examiner* — Liangche A Wang
*Assistant Examiner* — Johnny Aguiar
(74) *Attorney, Agent, or Firm* — Won Tae C. Kim

(57) ABSTRACT

An apparatus, a method, and a computer program product are provided in which an information block is generated to include an expression encoded based on at least one of a peer discovery resource identifier or an area identifier. The information block is sent for broadcasting. An apparatus, a method, and a computer program product are provided in which an information block is received that includes an expression encoded based on at least one of a peer discovery resource identifier or an area identifier. The information block is decoded based on said at least one of the peer discovery resource identifier or the area identifier to obtain the expression.

40 Claims, 13 Drawing Sheets

(56) References Cited

U.S. PATENT DOCUMENTS

| | | | |
|---|---|---|---|
| 2004/0064693 A1 | 4/2004 | Pabla et al. | |
| 2005/0080858 A1* | 4/2005 | Pessach | 709/206 |
| 2005/0245199 A1* | 11/2005 | Batra et al. | 455/73 |
| 2006/0235967 A1* | 10/2006 | Fritz | 709/224 |
| 2007/0153924 A1* | 7/2007 | Ling et al. | 375/260 |
| 2007/0237184 A1* | 10/2007 | Park et al. | 370/487 |
| 2008/0002642 A1 | 1/2008 | Borkar et al. | |
| 2008/0109374 A1 | 5/2008 | Levergood et al. | |
| 2009/0016255 A1* | 1/2009 | Park | 370/312 |
| 2009/0016524 A1* | 1/2009 | Park et al. | 380/44 |
| 2009/0327391 A1* | 12/2009 | Park et al. | 709/201 |
| 2009/0327395 A1* | 12/2009 | Park et al. | 709/202 |
| 2010/0094953 A1* | 4/2010 | Kwon et al. | 709/219 |
| 2010/0150053 A1* | 6/2010 | Becker et al. | 370/316 |
| 2010/0220720 A1* | 9/2010 | Seo et al. | 370/389 |
| 2010/0228972 A1* | 9/2010 | Wat et al. | 713/163 |
| 2010/0291872 A1* | 11/2010 | Laroia et al. | 455/41.2 |
| 2010/0330915 A1 | 12/2010 | Parizhsky et al. | |
| 2012/0082127 A1* | 4/2012 | Wu et al. | 370/330 |

FOREIGN PATENT DOCUMENTS

| | | |
|---|---|---|
| WO | WO-2009009392 | 1/2009 |
| WO | WO2009158643 | 12/2009 |
| WO | WO2009158656 | 12/2009 |

OTHER PUBLICATIONS

International Search Report and Written Opinion—PCT/US2012/020238—ISA/EPO—Mar. 14, 2012.

Wu, X., et al., "FlashLinQ: A synchronous distributed scheduler for peer-to-peer ad hoc networks", Communication, Control, and Computing(Allerton), 2010 48th Annual Allerton Conference on, IEEE, Sep. 29, 2010, pp. 514-521, XP031899421, DOI: 10.1109/ALLERTON.2010.5706950, ISBN: 978-1-4244-8215-3.

* cited by examiner

METHODS AND APPARATUS FOR ENHANCED SYSTEM ACCESS CONTROL FOR PEER-TO-PEER WIRELESS COMMUNICATION NETWORKS

BACKGROUND

1. Field

The present disclosure relates generally to communication systems, and more particularly, to enhanced system access control for peer-to-peer wireless communication networks.

2. Background

Application identifiers are expressions associated with applications that run on wireless devices. The expressions are broadcasted (advertised) to allow other applications to discover each other. There is a need for secure advertising of the expressions over a broadcast channel and for secure discovery of the broadcasted expressions.

SUMMARY

In an aspect of the disclosure, a method, an apparatus, and a computer-program product are provided in which an information block is generated to include an expression encoded based on at least one of a peer discovery resource identifier or an area identifier. In addition, the information block is sent for broadcasting.

In an aspect of the disclosure, a method, an apparatus, and a computer-program product are provided in which an information block is received that includes an expression encoded based on at least one of a peer discovery resource identifier or an area identifier. In addition, the information block is decoded based on said at least one of the peer discovery resource identifier or an area identifier to obtain the expression.

DETAILED DESCRIPTION

Figure 1:
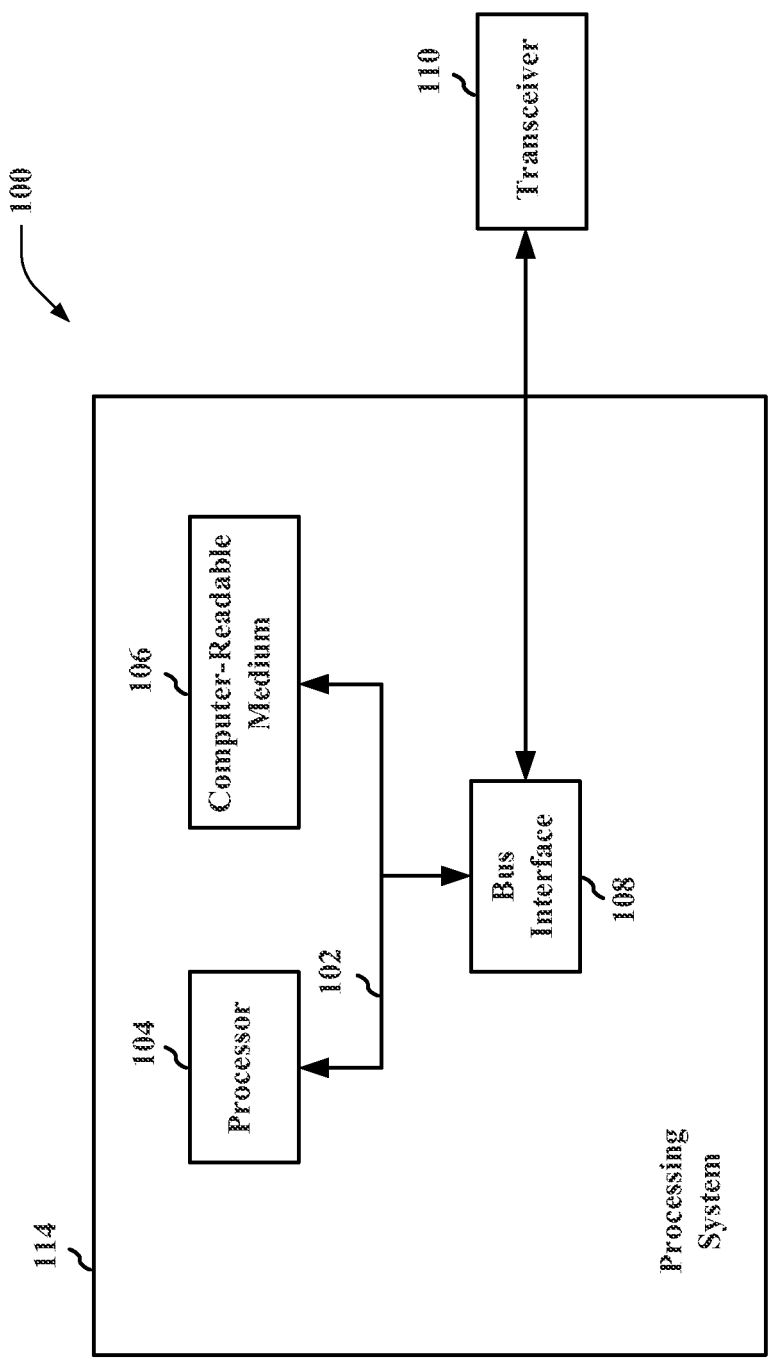
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
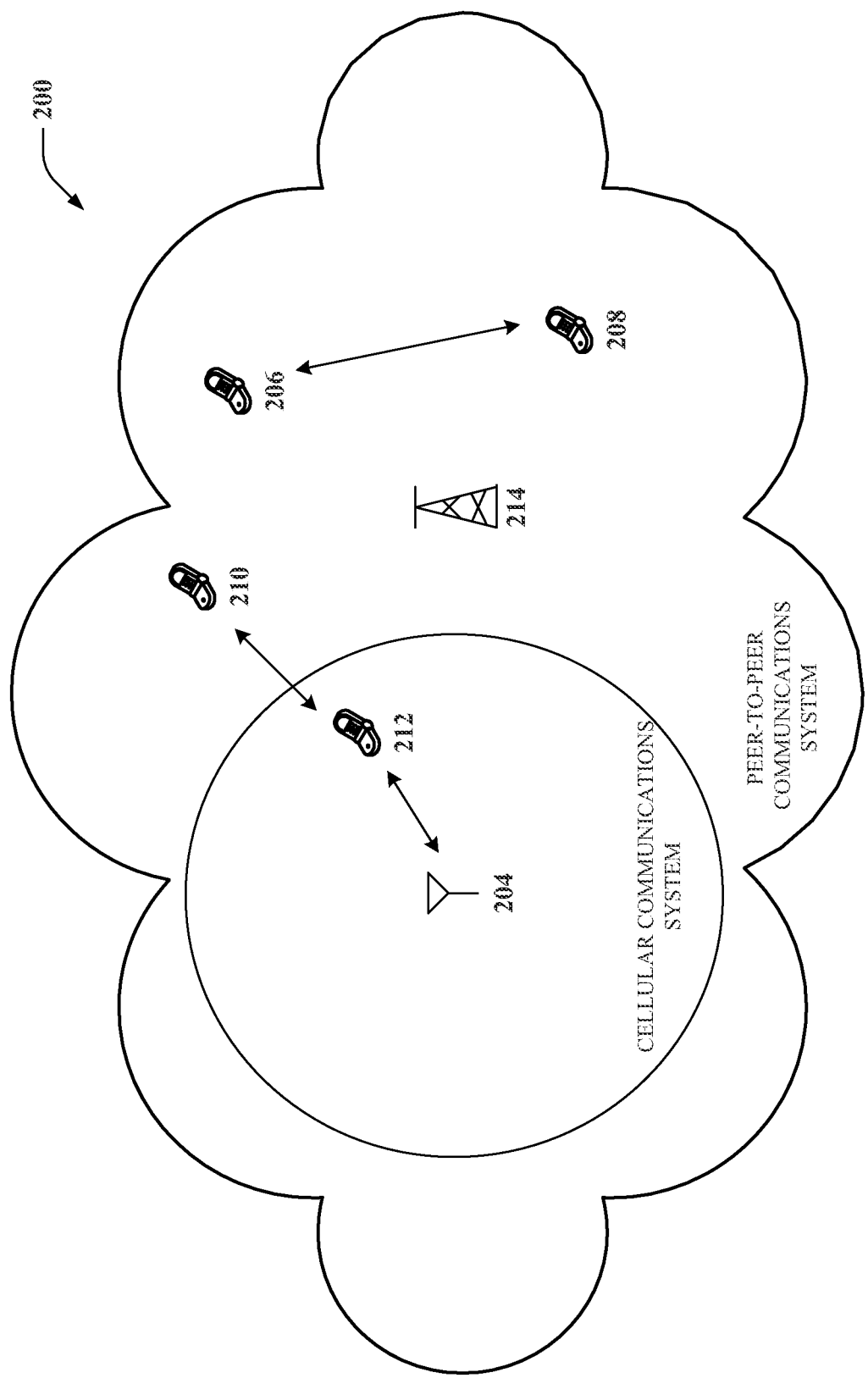
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The base station 204 and/or the transmitter 214 may provide timing information to the wireless devices. The transmitter 214 may be a peer-to-peer communication device or a non peer-to-peer communication device that transmits a timing signal and/or synchronization signal that the wireless devices can detect. For example, the transmitter 214 may be a beacon transmitter, a time synchronization transmitter, or a Global Positioning System (GPS) transmitter.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
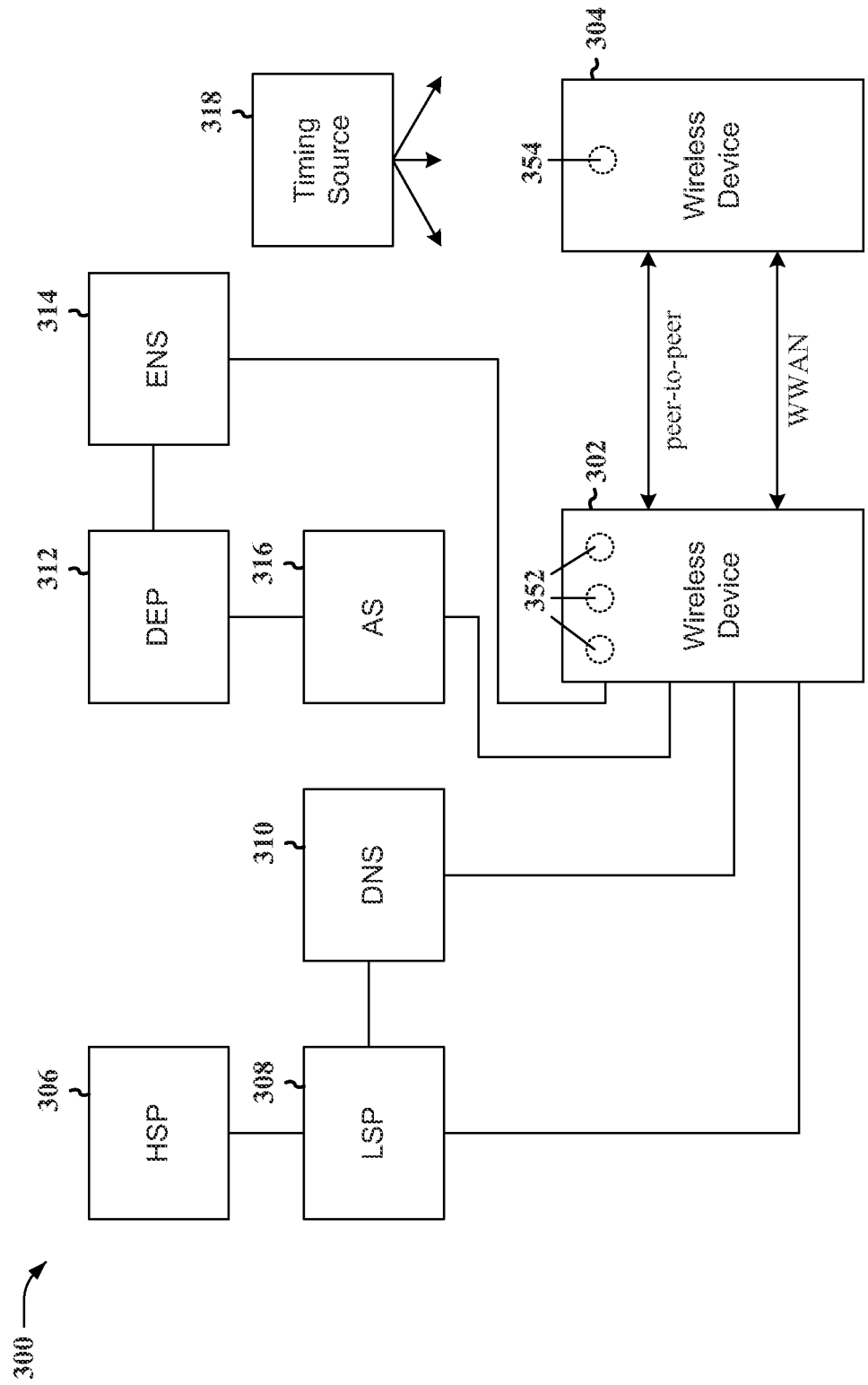
FIG. 3 is a diagram illustrating a system architecture for wireless peer-to-peer communications system.

FIG. 3 is a diagram illustrating a system architecture 300 for a wireless peer-to-peer communications system. As shown in FIG. 3, the wireless device 302 may communicate with the wireless device 304 directly through peer-to-peer communication or indirectly through a base station using WWAN communication. On each of the wireless devices 302, 304, applications may be active. For example, a plurality of applications 352 are running on the wireless device 302 and an application 354 is running on the wireless device 304. Each of the applications may be associated with a unique application identifier. An application identifier is an expression. An expression is referred to as "direct" if there is no privacy restriction on its discoverability. Direct expressions are strings that are broadcasted to allow applications to discover each other so that they may communicate together through peer-to-peer and/or WWAN communication. As such, direct expressions may be any application-defined information string, such a location, a service, or otherwise an identifier associated with a particular application running on a wireless device. Each direct expression may have a shorter form code representation. The code representation is referred to as a direct expression code.

The wireless device 302 receives an allocation of individual direct expressions from the Allocation Server (AS) 316. The AS may also be referred to as an Application Specific Allocator (ASA). There may be multiple ASs 316, all of which coordinate together to allocate unique direct expressions. The AS 316 is coupled to the Direct Expression Provider (DEP) 312. The DEP 312 manages direct expression name and code spaces and allocates blocks of direct expression codes to the AS 316. The wireless device 302 and the DEP 312 may obtain a mapping between any direct expression name and direct expression code from the Expression Name System (ENS) 314, which maintains a repository of mappings between direct expression names and codes.

The Home Service Provider (HSP) 306 authenticates and authorizes the wireless device 302 to use the subscription service. The Local Spectrum Provider (LSP) 308 enables the wireless device 302 to access the radio spectrum in a given area by providing the wireless device 302 authorizing information. The LSP 308 is coupled to the Domain Name Server (DNS) 310, which maintains DNS records so that wireless devices may look up an Internet Protocol (IP) address associated with a direct expression. The timing source 318 provides global timing information to the wireless devices that have a subscription through the HSP 306.

As discussed supra, application identifiers are expressions of entities, services, locations, or other information associated with an application. The expressions are broadcasted (advertised) to allow other applications to discover each other. In the following figures, methods of encoding/decoding direct expressions are provided in order to provide secure advertising of the expressions over a broadcast channel and secure discovery of the broadcasted expressions.

Figure 4:
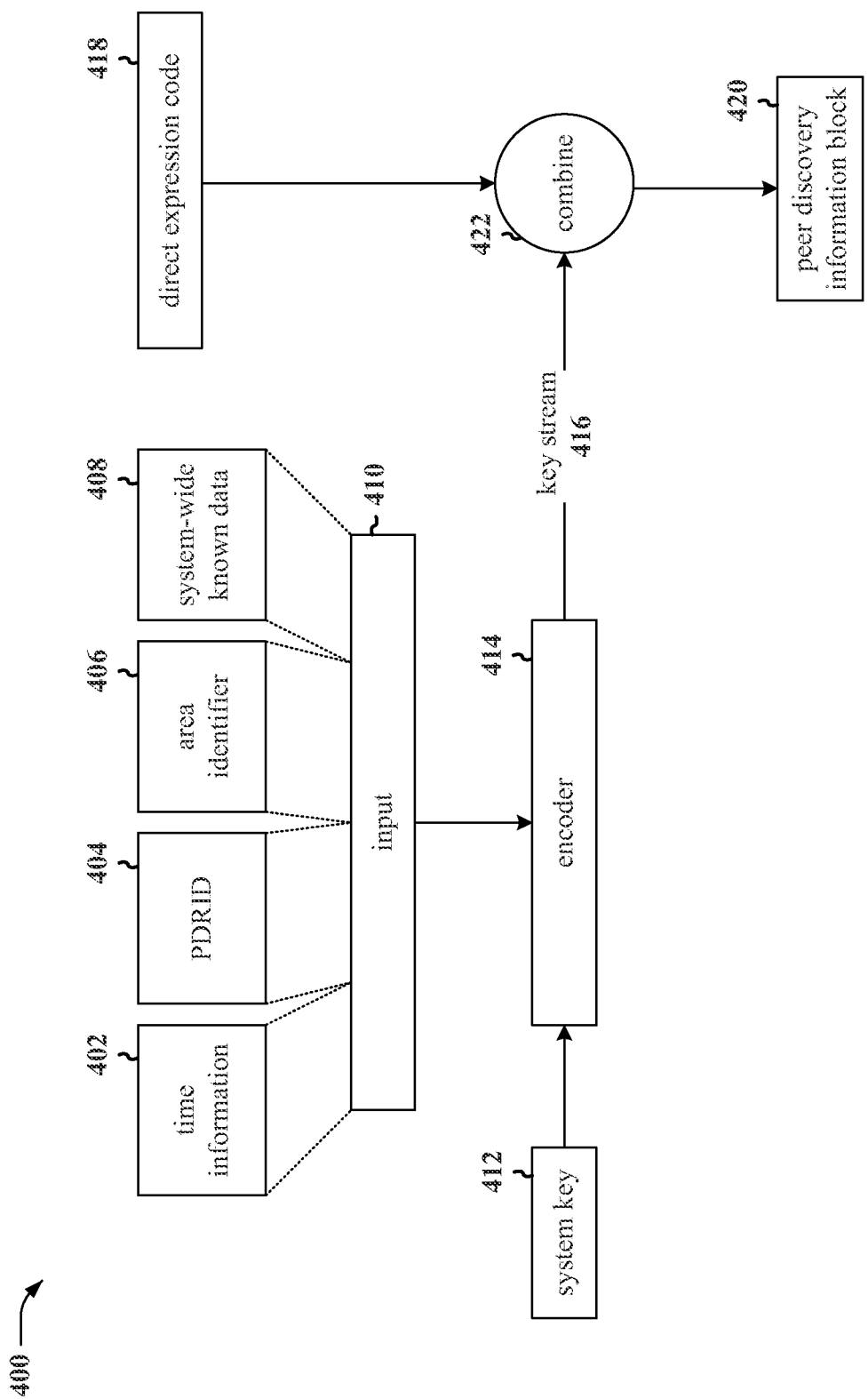
FIG. 4 is a block diagram for illustrating a first exemplary method of encoding a direct expression into a peer discovery information block.

FIG. 4 is a block diagram 400 for illustrating a first exemplary method of encoding a direct expression into a peer discovery information block. The method is performed by a wireless device 302. The wireless device 302 may be allocated a direct expression. The direct expression string corresponds to a direct expression code 418, which is a code representation of the direct expression string. The direct expression code 418 is encoded into a peer discovery information block 420. The wireless device 302 broadcasts/advertises the peer discovery information block 420 in a peer discovery channel. As shown in FIG. 4, the direct expression code 418 is combined 422 with a key stream 416 to generate the peer discovery information block 420. In one configuration, the direct expression code 418 is combined 422 with the key stream 416 using an XOR operation. Combining using an XOR operation allows for a subset of the peer discovery information block 420 to be decoded and utilized without decoding the entire peer discovery information block 420. In other configurations, the direct expression code 418 is combined using other logical operations, such as for example, through an OR operation, an AND operation, or any combination of OR and AND operations. The key stream 416 is output by an encoder 414. The encoder 414 may be a time-varying encoder 414. The encoder 414 generates the key stream 416 based on a system key 412 and an input 410. The input 410 includes at least one of a peer discovery resource identifier (PDRID) 404 or an area identifier 406. The PDRID 404 is associated with a particular peer discovery subchannel, which includes a particular set of orthogonal frequency divisional multiplexing (OFDM) symbols in a peer discovery channel. That is, each PDRID 404 maps to a set of OFDM symbols for use for peer discovery. The area identifier 406 is an identifier (geographic location information) associated with a particular area, such as for example, a GPS location, an area defined by a GPS location, or an identifier from a local beacon. Areas outside the particular area have different area identifiers 406. The input 410 may also include time information 402. The time information 402 may be obtained from the timing source 318. The input 410 may further include system-wide known data 408. The system-wide known data 408 is a set of known bits that may be used to pad the input 410.

The time information 402 adds security to the communication of the peer discovery information block 420, as the time information 402 introduces variation over time into the communicated peer discovery information block 420 while still permitting wireless devices that receive the peer discovery information block 420 to interpret the communicated information. As such, the peer discovery information block 420 is effectively a time-stamped, pseudo-random sequence. The time-stamped peer discovery information block 420 can reassure a receiving wireless device that the broadcast is recent and is not a replay from the past. Furthermore, if the key stream 416 is somehow decoded (e.g., by a cryptographic attack) by a rogue wireless device which does not have access to the (secret) system key 412, the key stream 416 may only be used to decode peer discovery information blocks that were encoded with the same time information 402 through which the key stream 416 was derived. As such, a compromised (fraudulently obtained) key stream 416 would have only limited use.

The area identifier 406 adds further security to the communication of the peer discovery information block 420, as the area identifier 406 introduces area-dependent variation into the communicated peer discovery information block 420. As such, the peer discovery information block 420 is effectively space-stamped. The space-stamped peer discovery information block 420 can reassure a receiving wireless device that the broadcast was not sent in some other region. Furthermore, if the key stream 416 is somehow compromised, the key stream 416 may only be used to decode peer discovery information blocks that were encoded with the same area identifier 406 through which the key stream 416 was derived. As such, a compromised key stream 416 would have only limited use in the region in which the compromised key stream 416 was derived.

The PDRID 404 adds another layer of security to the communication of the peer discovery information block 420, as the PDRID 404 introduces channel-dependent variation into the communicated peer discovery information block 420. As such, the peer discovery information block 420 is effectively channel-stamped. If the key stream 416 is somehow compromised, the key stream 416 may only be used to decode peer discovery information blocks that were encoded with the same PDRID 404 through which the key stream 416 was derived. As such, a compromised key stream 416 could not be used for the discovery of other expressions being advertised at the same time and location, but in a different channel resource.

Figure 5:
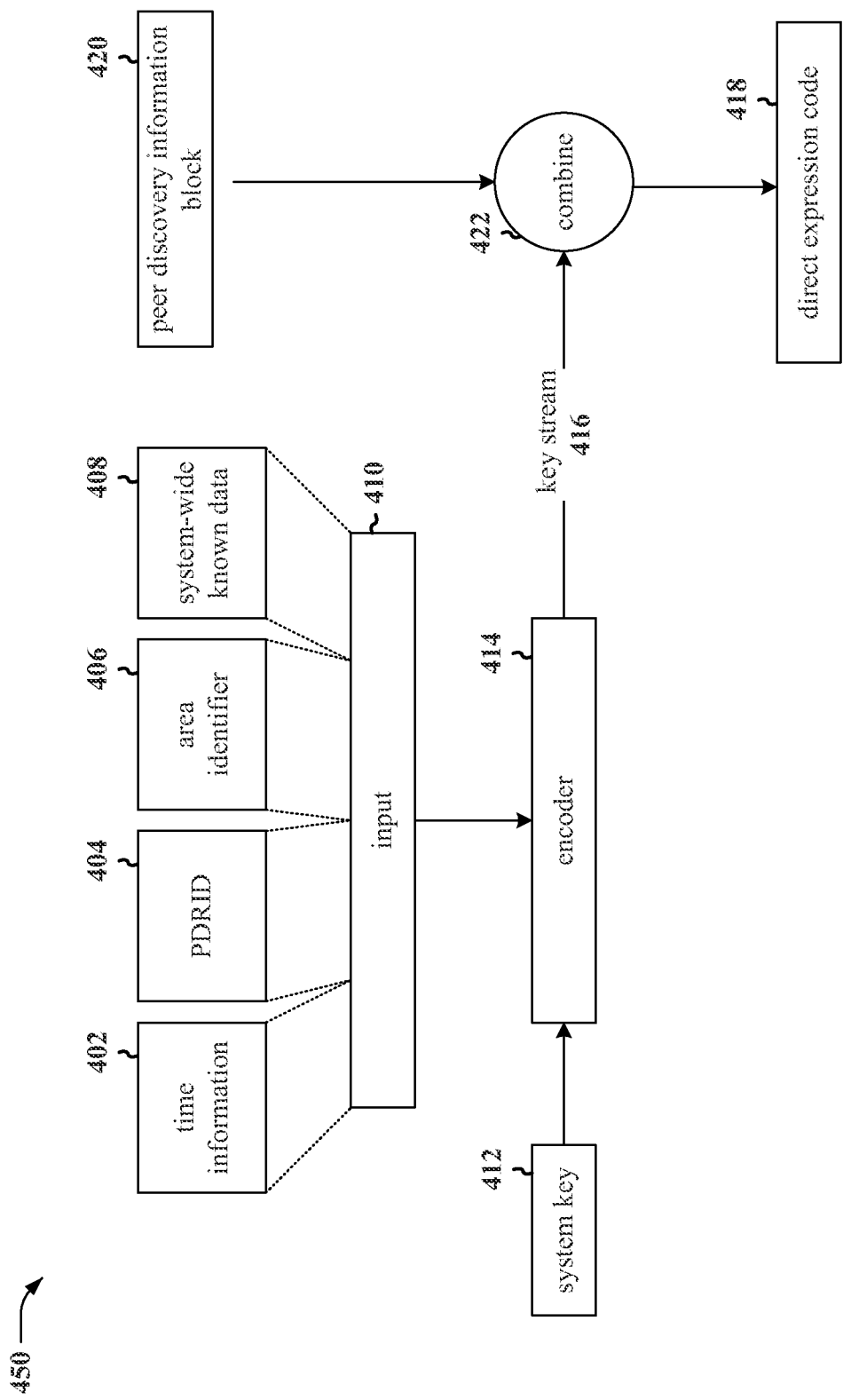
FIG. 5 is a block diagram for illustrating a first exemplary method of decoding a peer discovery information block to obtain a direct expression.

FIG. 5 is a block diagram 450 for illustrating a first exemplary method of decoding a peer discovery information block to obtain a direct expression. As shown in FIG. 5, the peer discovery information block 420 is combined 422 with a key stream 416 in order to recover the direct expression code 418. The peer discovery information block 420 is combined 422 with the key stream 416 using logical operations, such as for example, XOR, AND, and/or OR operations. As discussed supra, combining using an XOR operation allows for a subset of the peer discovery information block 420 to be decoded in order to obtain only the portions of the direct expression code 418 that are needed. The key stream 416 is output by an encoder 414. The encoder 414 generates the key stream 416 based on a system key 412 and an input 410. The input 410 includes at least one of a PDRID 404 or an area identifier 406. The input 410 may also include time information 402. The input 410 may further include system-wide known data 408.

Figure 6:
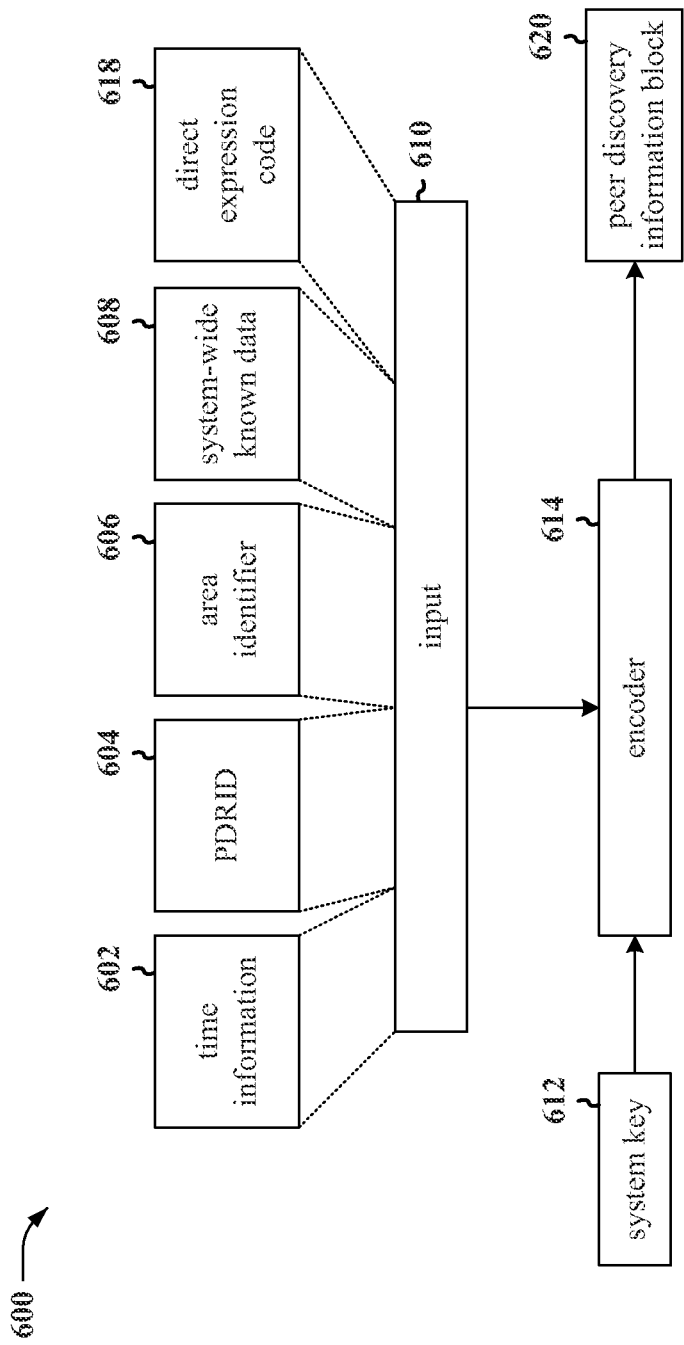
FIG. 6 is a block diagram for illustrating a second exemplary method of encoding a direct expression into a peer discovery information block.

FIG. 6 is a block diagram 600 for illustrating a second exemplary method of encoding a direct expression into a peer discovery information block. As shown in FIG. 6, the direct expression code 618 may be an input to the encoder 614. The encoder 614 receives as input the input 610 and the system key 612 and outputs the peer discovery information block 620. The input 610 includes the direct expression code 618 and at least one of a PDRID 604 and an area identifier 606. The input 610 may further include time information 602 and/or system-wide known data 608. The encoder 614 may be a time-varying encoder and may employ a cipher algorithm or a message authentication code algorithm (sometimes called a keyed (cryptographic) hash function) for performing the encryption.

Figure 7:
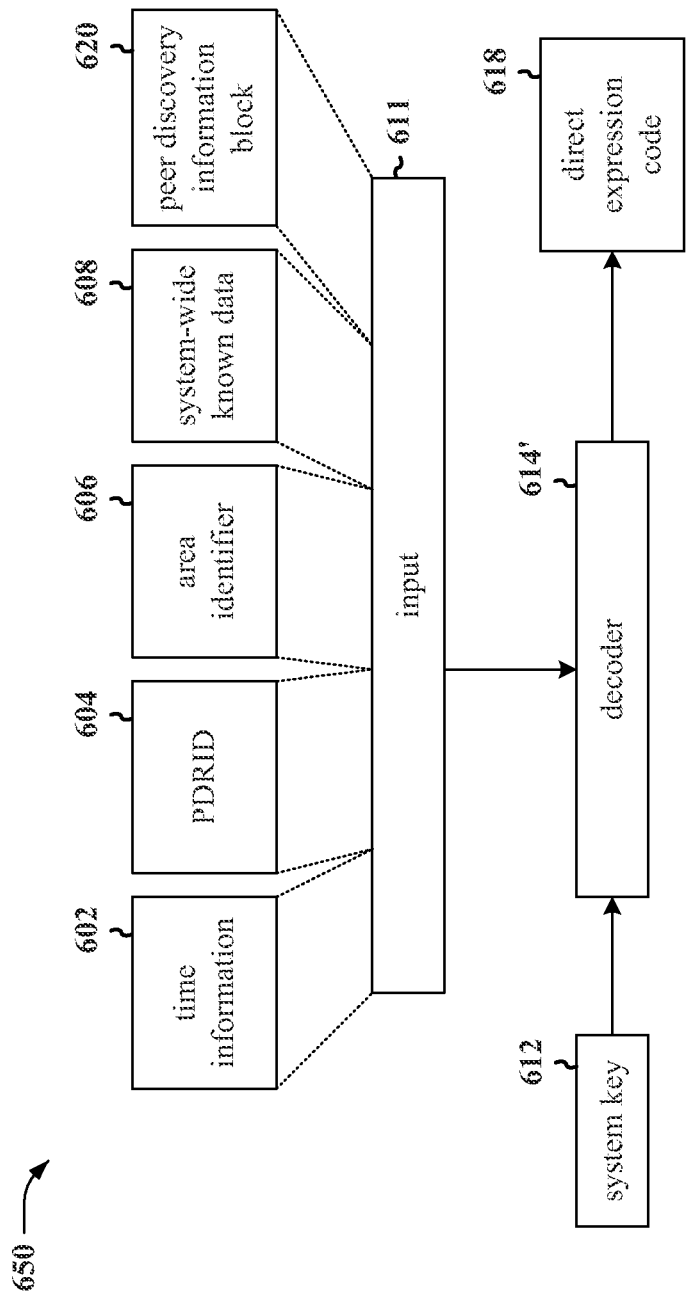
FIG. 7 is a block diagram for illustrating a second exemplary method of decoding a peer discovery information block to obtain a direct expression.

FIG. 7 is a block diagram 650 for illustrating a second exemplary method of decoding a peer discovery information block to obtain a direct expression. As shown in FIG. 7, the decoder 614' decodes the peer discovery information block 620 based on the system key 612 and other input in order to obtain the direct expression code 618. The input 611 includes the peer discovery information block 620 and at least one of a PDRID 604 or an area identifier 606. The input 611 may further include timing information 602 and/or system-wide known data 608. The decoder 614' may employ a cipher algorithm or a message authentication code algorithm for performing the decryption.

As discussed supra, the peer discovery information block may be encoded/encrypted with time information in order to provide a time-stamp to protect against "replay attacks." Methods for further securing the advertising of the expressions over a broadcast channel and for securing the discovery of the broadcasted expressions are provided in FIGS. 8-11. In the methods, a peer discovery information block for broadcasting is encoded along with at least one of a PDRID in order to provide a channel-stamp, or an area identifier in order to provide a space-stamp to protect against "wormhole attacks." A wireless device that receives a particular peer discovery information block encoded with the correct area identifier may be reassured that the broadcast received is not one that was broadcasted in another region with a different area identifier. Furthermore, a rogue wireless device that obtains the key stream without paying for (or being authorized to use) the system key will obtain only limited use of the key stream, as the key stream may only be used to decode/decrypt peer discovery information blocks that were derived with the same PDRID and/or area identifier.

Figure 8:
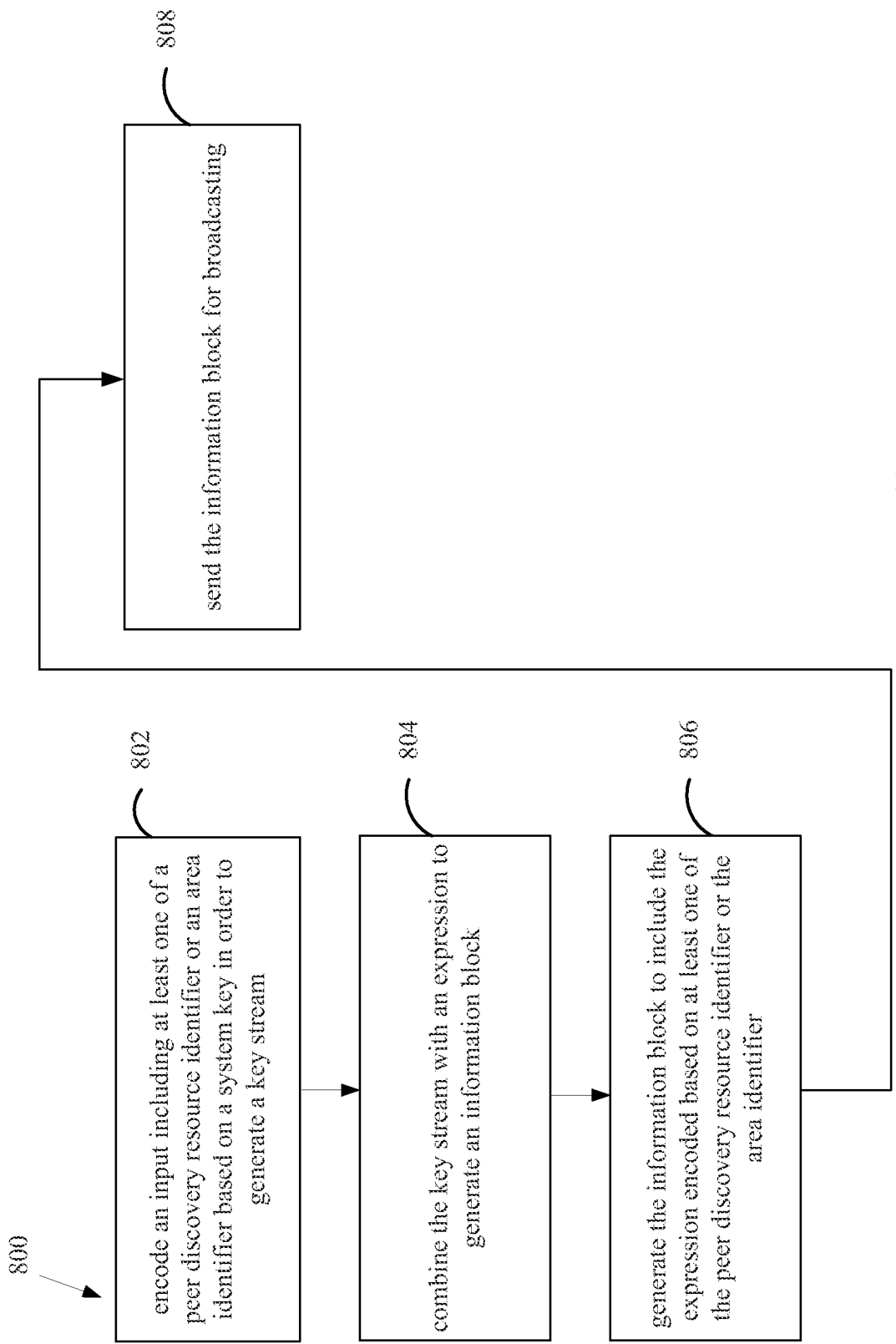
FIG. 8 is a flow chart of an exemplary method in relation to FIG. 4.

FIG. 8 is a flow chart 800 of an exemplary method. The method is performed by a wireless device 302 in relation to FIG. 4. As shown in FIG. 8, the wireless device 302 encodes an input including at least one of a PDRID or an area identifier based on a system key in order to generate a key stream (802). The wireless device 302 combines the key stream with an expression to generate an information block (804). The wireless device 302 generates the information block to include the expression encoded based on at least one of the PDRID or the area identifier (806). The wireless device 302 sends the information block for broadcasting (808). The information block may be a peer discovery information block. The expression may be unique. The input may further include a timing sequence. The input may include both the PDRID and the area identifier. The input may further include system-wide known data.

Figure 9:
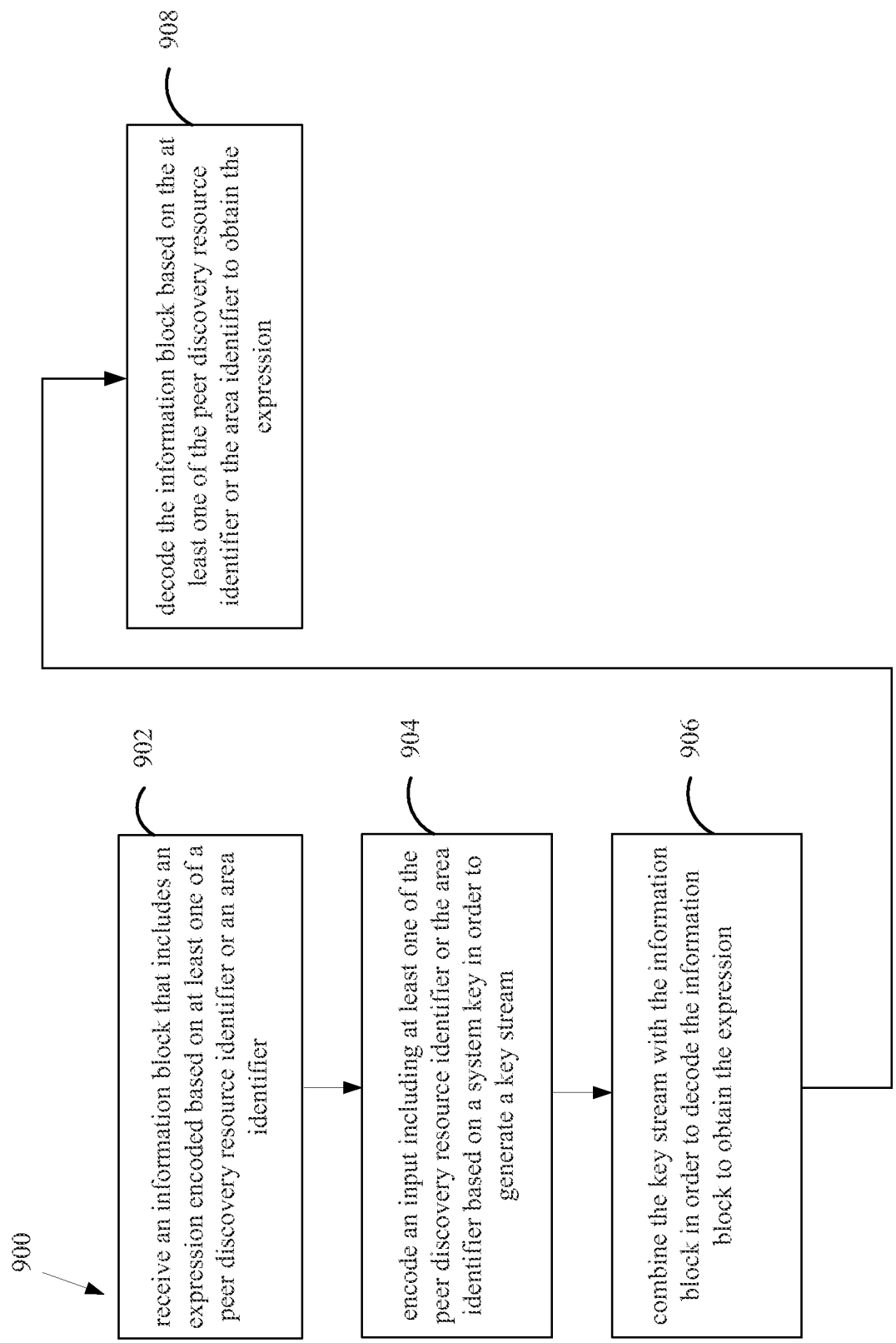
FIG. 9 is a flow chart of an exemplary method in relation to FIG. 5.

FIG. 9 is a flow chart 900 of an exemplary method. The method is performed by the wireless device 302 in relation to FIG. 5. As shown in FIG. 9, the wireless device 302 receives an information block that includes an expression encoded based on at least one of a PDRID or an area identifier (902). The wireless device 302 encodes an input including at least one of the PDRID or the area identifier based on a system key in order to generate a key stream (904). The wireless device 302 combines the key stream with the information block in order to decode the information block to obtain the expression (906). The wireless device 302 decodes the information block based on said at least one of the PDRID or the area identifier to obtain the expression (908). The information block may be a peer discovery information block. The expression may be unique. The input may further include a timing sequence. The input may include both the peer discovery resource identifier and the area identifier. The input may further include system-wide known data.

Figure 10:
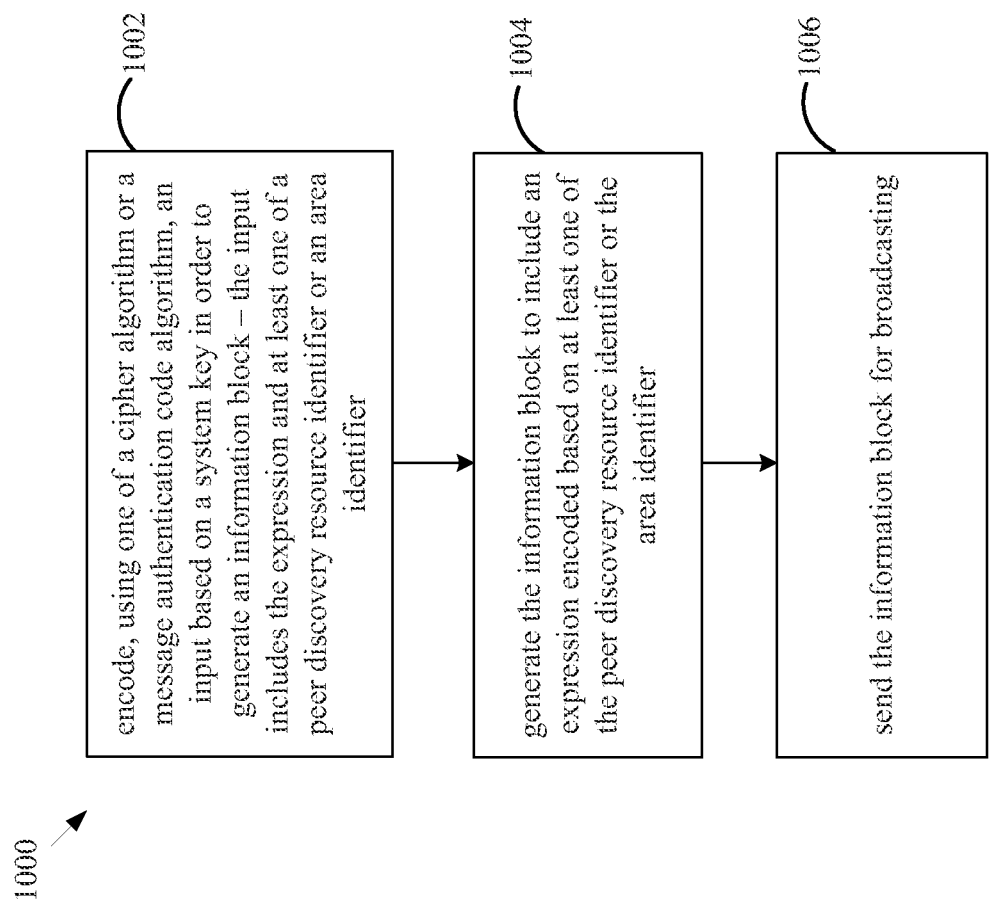
FIG. 10 is a flow chart of an exemplary method in relation to FIG. 6.

FIG. 10 is a flow chart 1000 of an exemplary method. The method is performed by the wireless device 302 in relation to FIG. 6. As shown in FIG. 10, the wireless device 302 encodes, using one of a cipher algorithm or a message authentication code algorithm, an input based on a system key in order to generate an information block (1002). The input includes an expression and at least one of a PDRID or an area identifier (1002). In addition, the wireless device 302 generates the information block to include the expression encoded based on at least one of the PDRID or the area identifier (1004). Furthermore, the wireless device 302 sends the information block for broadcasting (1006).

Figure 11:
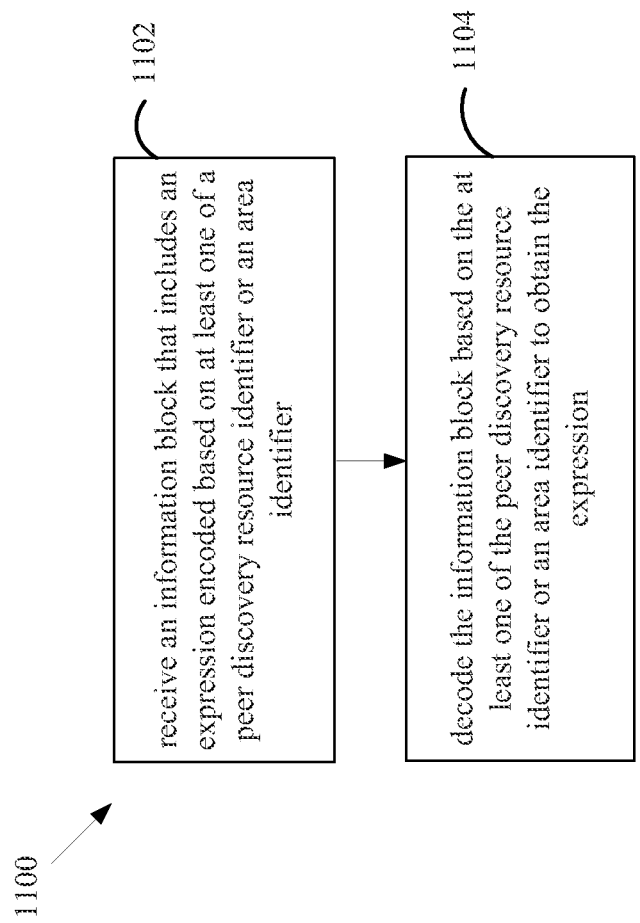
FIG. 11 is a flow chart of an exemplary method in relation to FIG. 7.

FIG. 11 is a flow chart 1100 of an exemplary method. The method is performed by a wireless device 302 in relation to FIG. 7. As shown in FIG. 11, the wireless device 302 receives an information block that includes an expression encoded based on at least one of a PDRID or an area identifier (1102). In addition, the wireless device 302 decodes the information block based on the at least one of the PDRID or the area identifier to obtain the expression (1104). The wireless device 302 may perform the decoding with one of a cipher algorithm or a message authentication code algorithm. In such a configuration, the wireless device 302 performs the decoding on an input based on a system key in order to decode the information block to obtain the expression. The input includes the information block and at least one of the PDRID or the area identifier.

Figure 12:
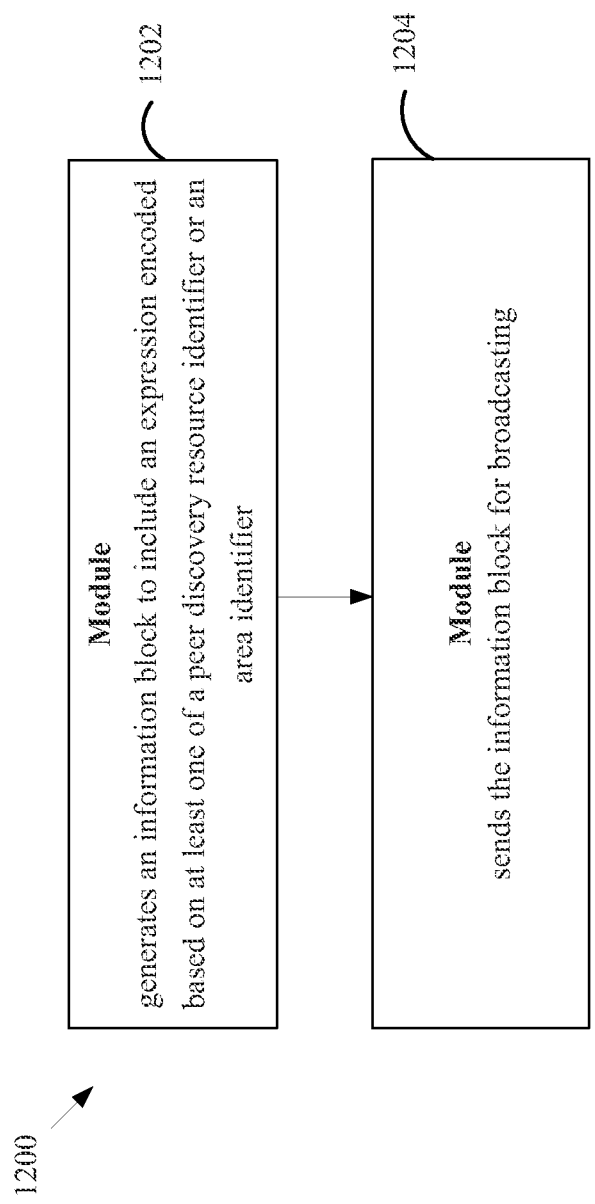
FIG. 12 is a conceptual block diagram illustrating the functionality of a first exemplary apparatus.

FIG. 12 is a conceptual block diagram 1200 illustrating the functionality of an exemplary apparatus 100, which may be a wireless device 302. The apparatus 100 includes a module 1202 that generates an information block to include an expression encoded based on at least one of a PDRID or an area identifier. In addition, the apparatus 100 includes a module 1204 that sends the information block for broadcasting.

Figure 13:
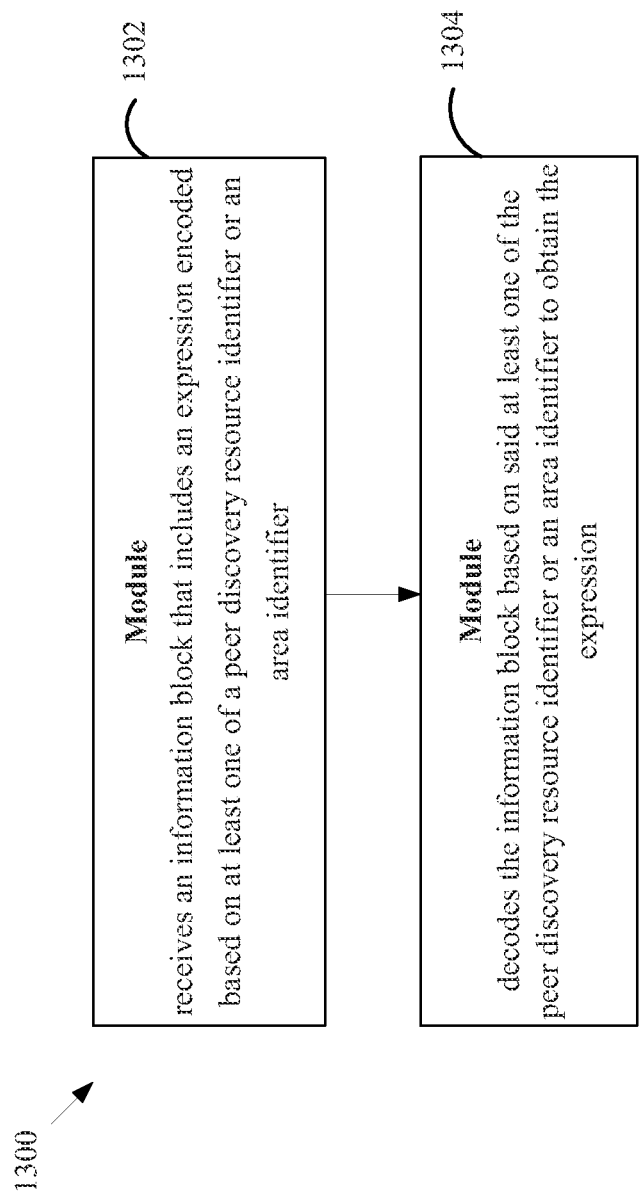
FIG. 13 is a conceptual block diagram illustrating the functionality of a second exemplary apparatus.

FIG. 13 is a conceptual block diagram 1300 illustrating the functionality of an exemplary apparatus 100, which may be a wireless device 302. The apparatus 100 includes a module 1302 that receives an information block that includes an expression encoded based on at least one of a PDRID or an area identifier. In addition, the apparatus 100 includes a module 1304 that decodes the information block based on said at least one of the PDRID or the area identifier to obtain the expression.

Referring to FIG. 1, in one configuration, the apparatus 100 for wireless communication is a wireless device 302 and includes means for generating an information block to include an expression encoded based on at least one of a PDRID or an area identifier. In addition, the apparatus 100 includes means for sending the information block for broadcasting. The apparatus 100 may further include means for encoding an input comprising at least one of the PDRID or the area identifier based on a system key in order to generate a key stream. The apparatus 100 may further include means for combining the key stream with the expression to generate the information block. The apparatus 100 may further include means for encoding, using one of a cipher algorithm or a message authentication code algorithm, an input based on a system key in order to generate the information block. The input includes the expression and at least one of the PDRID or the area identifier. The aforementioned means is the processing system 114 configured to perform the functions recited by the aforementioned means.

In another configuration, the apparatus 100 for wireless communication is a wireless device 302 and includes means for receiving an information block that includes an expression encoded based on at least one of a PDRID or an area identifier. In addition, the apparatus 100 includes means for decoding the information block based on said at least one of the PDRID or the area identifier to obtain the expression. The apparatus 100 may further include means for encoding an input comprising at least one of the PDRID or the area identifier based on a system key in order to generate a key stream. The apparatus 100 may further include means for combining the key stream with the information block in order to decode the information block to obtain the expression. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication by a wireless device, comprising:
    generating, by the wireless device, an information block comprising an expression, wherein the expression is an application identifier; and
    broadcasting, by the wireless device, the information block over a peer discovery channel, and
    wherein the information block is encoded for security with a system key and an input, the input comprising a peer discovery resource identifier, an area identifier, a time information, and a system-wide known data used to pad the input, and wherein the peer discovery resource identifier indicates a subchannel of the peer discovery channel.

2. The method of claim 1, wherein the information block is a peer discovery information block.

3. The method of claim 1, wherein the expression is unique.

4. The method of claim 1, further comprising encoding the input comprising the peer discovery resource identifier and the area identifier based on the system key in order to generate a key stream.

5. The method of claim 4, further comprising combining the key stream with the expression to generate the information block.

6. The method of claim 4, wherein the input further comprises a timing sequence.

7. The method of claim 1, further comprising encoding, using one of a cipher algorithm or a message authentication code algorithm, the input based on the system key in order to generate the information block, the input comprising the expression, the peer discovery resource identifier and the area identifier.

8. The method of claim 1, wherein the subchannel comprises at least one orthogonal frequency divisional multiplexing (OFDM) symbol in the peer discovery channel.

9. A method of wireless communication by a wireless device, comprising:
    receiving, by the wireless device, an information block comprising an expression, wherein the expression is an application identifier; and
    decoding, by the wireless device, the information block to obtain the expression for discovery of an application stored at a peer wireless device,
    wherein the decoding is based at least on a system key and an input, the input comprising a peer discovery resource identifier, an area identifier, a time information, and a system-wide known data used to pad the input, and wherein the peer discovery resource identifier indicates a subchannel of a peer discovery channel.

10. The method of claim 9, wherein the information block is a peer discovery information block.

11. The method of claim 9, wherein the expression is unique.

12. The method of claim 9, further comprising encoding the input comprising the peer discovery resource identifier and the area identifier based on the system key in order to generate a key stream.

13. The method of claim 12, further comprising combining the key stream with the information block in order to decode the information block to obtain the expression.

14. The method of claim 12, wherein the input further comprises a timing sequence.

15. The method of claim 9, wherein the decoding is performed with one of a cipher algorithm or a message authentication code algorithm, the decoding being performed on the input based on the system key in order to decode the information block to obtain the expression, the input comprising the information block, the peer discovery resource identifier and the area identifier.

16. The method of claim 9, wherein the subchannel comprises at least one orthogonal frequency divisional multiplexing (OFDM) symbol in the peer discovery channel.

17. An apparatus being a wireless device for wireless communication, comprising:
    means for generating an information block comprising an expression, wherein the expression is an application identifier; and
    means for broadcasting the information block over a peer discovery channel, and
    wherein the information block is encoded for security with a system key and an input, the input comprising a peer discovery resource identifier, an area identifier, a time information, and a system-wide known data used to pad the input, and wherein the peer discovery resource identifier indicates a subchannel of the peer discovery channel.

18. The apparatus of claim 17, wherein the information block is a peer discovery information block.

19. The apparatus of claim 17, wherein the expression is unique.

20. The apparatus of claim 17, further comprising means for encoding the input comprising the peer discovery resource identifier and the area identifier based on the system key in order to generate a key stream.

21. The apparatus of claim 20, further comprising means for combining the key stream with the expression to generate the information block.

22. The apparatus of claim 20, wherein the input further comprises a timing sequence.

23. The apparatus of claim 17, further comprising means for encoding, using one of a cipher algorithm or a message authentication code algorithm, the input based on the system key in order to generate the information block, the input comprising the expression, the peer discovery resource identifier and the area identifier.

24. The apparatus of claim 17, wherein the subchannel comprises at least one orthogonal frequency divisional multiplexing (OFDM) symbol in the peer discovery channel.

25. An apparatus being a wireless device for wireless communication, comprising:

means for receiving an information block comprising an expression wherein the expression is an application identifier; and means for decoding the information block to obtain the expression for discovery of an application stored at a peer wireless device, and wherein the decoding is based at least on a system key and an input, the input comprising a peer discovery resource identifier, an area identifier, a time information, and a system-wide known data used to pad the input, and wherein the peer discovery resource identifier indicates a subchannel of a peer discovery channel.

26. The apparatus of claim 25, wherein the information block is a peer discovery information block.

27. The apparatus of claim 25, wherein the expression is unique.

28. The apparatus of claim 25, further comprising means for encoding the input comprising the peer discovery resource identifier and the area identifier based on the system key in order to generate a key stream.

29. The apparatus of claim 28, further comprising means for combining the key stream with the information block in order to decode the information block to obtain the expression.

30. The apparatus of claim 28, wherein the input further comprises a timing sequence.

31. The apparatus of claim 25, wherein the means for decoding performs the decoding with one of a cipher algorithm or a message authentication code algorithm, the means for decoding performs the decoding on the input based on the system key in order to decode the information block to obtain the expression, and the input comprises the information block, the peer discovery resource identifier and the area identifier.

32. The apparatus of claim 25, wherein the subchannel comprises at least one orthogonal frequency divisional multiplexing (OFDM) symbol in the peer discovery channel.

33. A non-transitory computer readable medium storing computer executable code for wireless communication by a wireless device, comprising:

code for generating an information block comprising an expression, wherein the expression is an application identifier; and code for broadcasting the information block over a peer discovery channel, and wherein the information block is encoded for security with a system key and an input, the input comprising a peer discovery resource identifier, an area identifier, a time information, and a system-wide known data used to pad the input, and wherein the peer discovery resource identifier indicates a subchannel of the peer discovery channel.

34. The computer program product of claim 33, wherein the subchannel comprises at least one orthogonal frequency divisional multiplexing (OFDM) symbol in the peer discovery channel.

35. A non-transitory computer readable medium storing computer executable code for wireless communication by a wireless device, comprising:

code for receiving an information block comprising an expression wherein the expression is an application identifier; and code for decoding the information block to obtain the expression for discovery of an application stored at a peer wireless device, and wherein the decoding is based at least on a system key and an input, the input comprising a peer discovery resource identifier, an area identifier, a time information, and a system-wide known data used to pad the input, and wherein the peer discovery resource identifier indicates a subchannel of a peer discovery channel.

36. The computer program product of claim 35, wherein the subchannel comprises at least one orthogonal frequency divisional multiplexing (OFDM) symbol in the peer discovery channel.

37. An apparatus being a wireless device for wireless communication, comprising:

a processing system configured to:

generate an information block comprising an expression, wherein the expression is an application identifier; and broadcast the information block for broadcasting to advertise the expression over a peer discovery channel, and wherein the information block is encoded for security with a system key and an input, the input comprising a peer discovery resource identifier, an area identifier, a time information, and a system-wide known data used to pad the input, and wherein the peer discovery resource identifier indicates a subchannel of the peer discovery channel.

38. The apparatus of claim 37, wherein the subchannel comprises at least one orthogonal frequency divisional multiplexing (OFDM) symbol in the peer discovery channel.

39. An apparatus being a wireless device for wireless communication, comprising:

a processing system configured to:

receive an information block comprising an expression, wherein the expression is an application identifier; and decode the information block to obtain the expression for discovery of an application stored at a peer wireless device, and wherein the decoding is based at least on a system key and an input, the input comprising a peer discovery resource identifier, an area identifier, a time information, and a system-wide known data used to pad the input, and wherein the peer discovery resource identifier indicates a subchannel of a peer discovery channel.

40. The apparatus of claim 39, wherein the subchannel comprises at least one orthogonal frequency divisional multiplexing (OFDM) symbol in the peer discovery channel.

* * * * *